US009645472B2

(12) United States Patent
Ollila

(10) Patent No.: US 9,645,472 B2
(45) Date of Patent: May 9, 2017

(54) MAGNETIC FLUID SHUTTER OPERATION

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/747,234

(22) Filed: Jun. 23, 2015

(65) Prior Publication Data

US 2016/0377960 A1 Dec. 29, 2016

(51) Int. Cl.
*G03B 9/08* (2006.01)
*G02B 26/00* (2006.01)

(52) U.S. Cl.
CPC ............ *G03B 9/08* (2013.01); *G02B 26/004* (2013.01)

(58) Field of Classification Search
USPC .......................................... 396/463
See application file for complete search history.

(56) References Cited

U.S. PATENT DOCUMENTS

| 5,955,934 | A | 9/1999 | Raj | |
| 7,646,545 | B2* | 1/2010 | Tanaka | G02B 5/005 359/665 |
| 8,102,230 | B2 | 1/2012 | Eriksen | |
| 8,253,094 | B2* | 8/2012 | Huang | B82Y 25/00 250/201.4 |
| 8,731,390 | B2 | 5/2014 | Goldenberg et al. | |
| 9,450,170 | B2 | 9/2016 | Schiepp et al. | |
| 2004/0263299 | A1 | 12/2004 | Noji | |
| 2006/0261680 | A1* | 11/2006 | Moon | H02K 33/18 310/14 |
| 2007/0127146 | A1* | 6/2007 | Moon | G02B 26/0833 359/871 |
| 2007/0286597 | A1* | 12/2007 | Hopper | G02B 26/004 396/506 |
| 2011/0116664 | A1 | 5/2011 | Fujiola et al. | |
| 2011/0122495 | A1* | 5/2011 | Togashi | G02B 7/023 359/557 |
| 2013/0002392 | A1 | 1/2013 | Parashar et al. | |
| 2014/0091646 | A1 | 4/2014 | Schiepp et al. | |
| 2015/0054359 | A1 | 2/2015 | Schiepp et al. | |

OTHER PUBLICATIONS

Ollila, Mikko; U.S. Appl. No. 14/497,859, entitled "Techniques for Optical Image Stabilization Using Magnetic Shape Memory Actuators" filed Sep. 26, 2014, 81 pages.

Assadsangabi, Babak, et al.; Planar Variable Inductor Controlled by Ferrofluid Actuation; IEEE Transactions on Magnetics, vol. 49, No. 4, dated Apr. 2013. 5 pages, Johor, Malaysia.

(Continued)

*Primary Examiner* — Clayton E Laballe
*Assistant Examiner* — Linda B Smith
(74) *Attorney, Agent, or Firm* — International IP Law Group, P.L.L.C.

(57) ABSTRACT

Techniques related to a method, apparatus, and systems for magnetic fluid shutter operation are described herein. For example, an apparatus may include an aperture of an image sensor. The apparatus may also include a ferrofluid to expose the aperture based on a propagation direction of a magnetic flux applied to the ferrofluid.

24 Claims, 7 Drawing Sheets

(56) References Cited

OTHER PUBLICATIONS

Ollila, Mikko: U.S. Patent Application Serial Number "Not Yet Assigned" entitled "Ferrofluid Material Interface for Magnetic Shape-Memory Element Configuration" filed Jun. 23, 2015, 37 pages.
Ollila, Mikko; U.S. Appl. No. 14/747,266, entitled "Ferrofluid Material Interface for Magnetic Shape-Memory Element Configuration" filed in the USPTO on Jun. 23, 2015, US Application, Drawings and Filing Receipt dated Jul. 23, 2015, 40 pages.
Ollila, Mikko; U.S. Appl. No. 14/863,884, entitled "Magnetic Fluid Optical Image Stabilization" filed in the USPTO on Sep. 24, 2015, US Application, Drawings and Filing Receipt dated Oct. 8, 2015, 31 pages.
Ollila, Mikko; U.S. Appl. No. 14/863,944, entitled "MEMS Led Zoom" filed in the USPTO on Sep. 24, 2015, US Application, Drawings and Filing Receipt dated Oct. 9, 2015, 35 pages.

\* cited by examiner

100

300

400

500

600

700

US 9,645,472 B2

MAGNETIC FLUID SHUTTER OPERATION

TECHNICAL FIELD

The present techniques generally relate to shutter operation. More specifically, the present techniques relate to magnetic fluid shutter operation.

BACKGROUND

Imaging sensors may include shutter mechanisms to control exposure to the imaging sensor. In some cases, imaging sensors may be components of small form factor systems. Smaller shutters implemented within increasingly smaller form factor systems may be more difficult to manufacture. Further, in some cases, actuation time of a shutter may be relatively long in comparison to an exposure time. Increasingly smaller exposure times may require increasingly smaller actuation times for a shutter to open, close, or any combination thereof.

BRIEF DESCRIPTION OF THE DRAWINGS

In some cases, the same numbers are used throughout the disclosure and the figures to reference like components and features. For example, numbers in the 100 series refer to features originally found in FIG. 1; numbers in the 200 series refer to features originally found in FIG. 2; and so on.

DESCRIPTION OF THE EMBODIMENTS

Various embodiments are generally directed to techniques for implementing a magnetic fluid shutter. As discussed above, smaller exposure times may require increasingly smaller actuation times for a shutter to open, close, or any combination thereof. Further, in some cases, smaller shutters implemented within increasingly smaller form factor systems may be more difficult to manufacture. Therefore, the techniques described herein include shutter operations performed via a magnetic fluid, such as a ferrofluid.

A ferrofluid, as referred to herein, is a ferromagnetic fluid configured to react to the presence of a magnetic field. In the techniques described herein, a ferrofluid that is at least partially opaque is used to open and close an aperture of an imaging device including an image sensor. A magnetic field may be generated by a coil disposed around a perimeter of the aperture. As current is applied to the coil, the ferrofluid may change disposition as a magnetic flux associated with the magnetic field propagates through the ferrofluid. In some cases, magnets are used to shape the magnetic field and direct the propagation of the magnetic flux. In other words, when current is applied to the coil, the ferrofluid will expose the aperture. When current is reversed, the ferrofluid may obscure the aperture.

In some cases, the techniques described herein may reduce shutter time that may otherwise occur with other shutter mechanisms that electromechanical, mechanical, or any combination thereof. Further, shading non-uniformity that may occur by a mechanical shutter may be reduced as the ferrofluid shutter will open and close in a more uniform manner. In some cases, the use of the ferrofluid shutter techniques discussed herein may also decrease form factor size as less mechanical components implemented in mechanical shutter actuators are employed.

Figure 1:
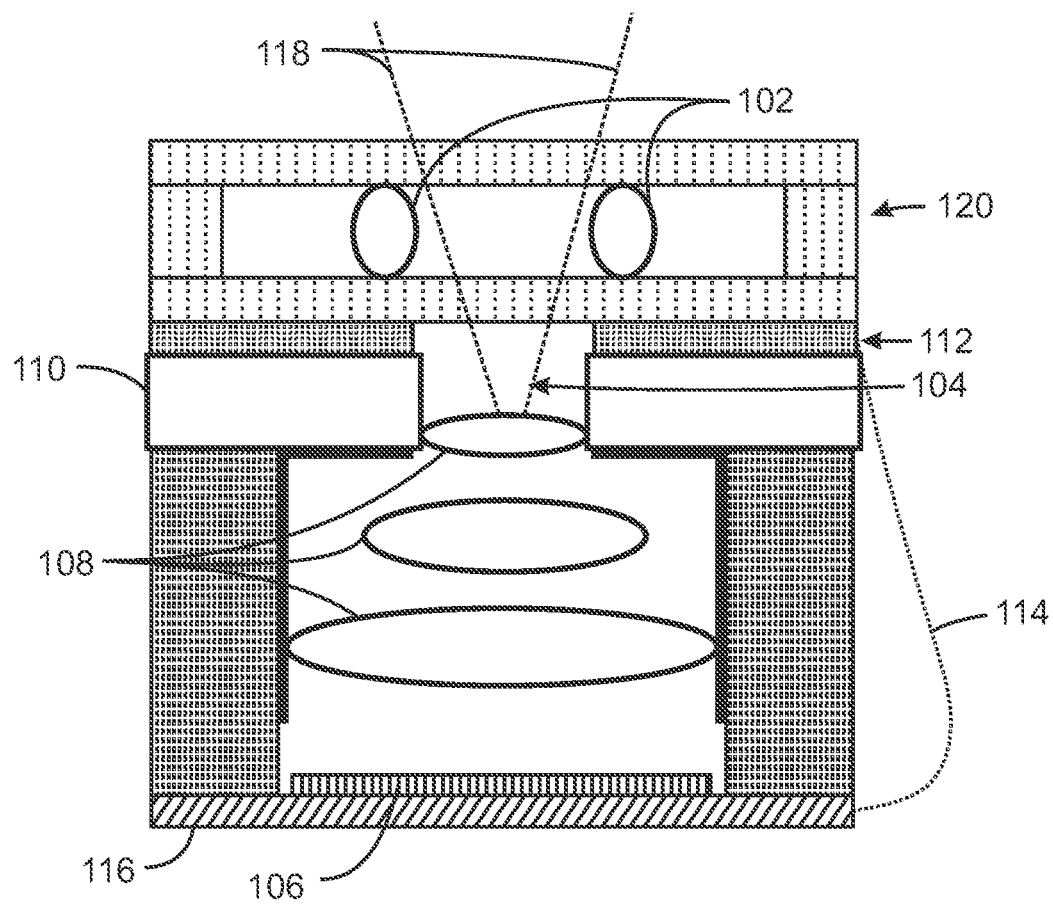
FIG. 1 is a block diagram of an apparatus including a ferrofluid shutter in an open position.

FIG. 1 is a block diagram of an apparatus including a ferrofluid shutter in an open position. As discussed above, in an imaging system 100, a ferrofluid, indicated at 102 may be used to open and close an aperture 104. Opening of the aperture 104 may expose light to an imaging sensor 106 though a lens system, indicated at 108. Although the lens system 108 includes multiple lenses in FIG. 1, any number of lenses may be includes.

The imaging system 100 also includes a magnet 110 and a coil 112. In some cases, the coil 110 may be configured to receive electric current through a voltage bus 114. The voltage bus 114 may be a flexible fine pitch coil electrically coupling the coil 110 to a power source 116. In some cases, the power source 116 may be a component of a computing device, such as a circuit board of a mobile computing device, having the imaging system 100.

As indicated in FIG. 1, the aperture 104 is exposed to light as the ferrofluid 102 does not obscure a light path indicated by the dashed lies 118. In some cases, the ferrofluid 102 is disposed within a container 120. The container 120 may be composed, at least partially, of a transparent material enabling the light path 118 to enter the aperture 104 when the ferrofluid 102 exposes the aperture 104.

Exposure of the aperture 104 may be implemented by applying current to the coil 112. As current is applied to the coil 112, a magnetic field having a magnetic flux configured to propagate through the ferrofluid 102 is generated. The magnet 110 may be configured to direct the propagation of the magnetic flux, resulting in shape changes of the ferrofluid. In other words, as magnetic flux having a direction away from the aperture 104 is applied to the ferrofluid 102, the aperture 104 may be exposed. As discussed in more detail below, as the current applied to the coil 112 is reversed, the aperture may be obscured by the ferrofluid 102, creating a magnetic fluid aperture.

As discussed above, the ferrofluid 102 may react quicker than a mechanically actuated shutter, thereby reducing the possibility of shading that may occur as a mechanical shutter slides across the aperture 102. Further, the shutter mechanism including the ferrofluid 102 may be less resistant to mechanical wear over time in comparison to a mechanical shutter. Although not specifically illustrated in FIG. 1, the ferrofluid 102 may be implemented with a colorized agent configured to provide a unique design when the aperture 102 is obscured by the ferrofluid 102.

Figure 2:
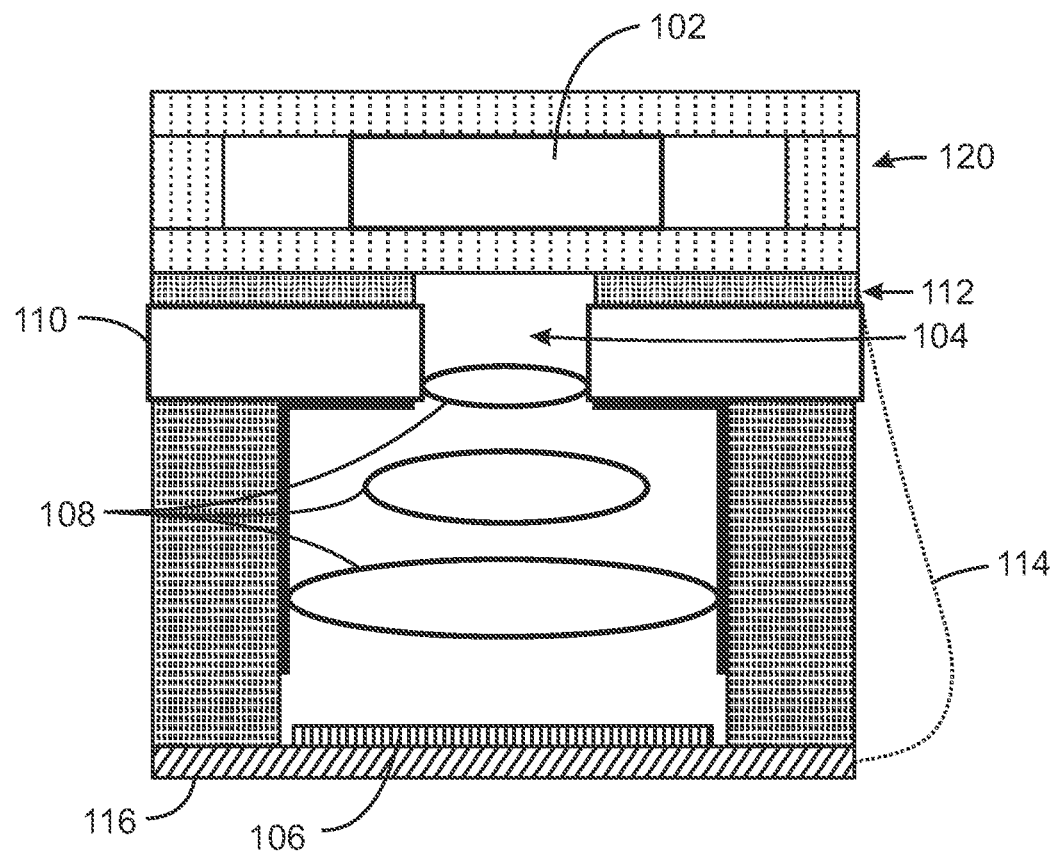
FIG. 2 is a block diagram of the apparatus including the ferrofluid shutter in a closed position.

FIG. 2 is a block diagram of the apparatus including the ferrofluid shutter in a closed position. As discussed above, the aperture 104 of FIG. 1 may be obscured by the ferrofluid 102 by reducing current applied to the coil 110, as indicated at 200. Reducing current will reduce magnetic flux and strength of the magnetic field associated with the coil 112 and the propagation direction associated with the magnet 110.

Figure 3:
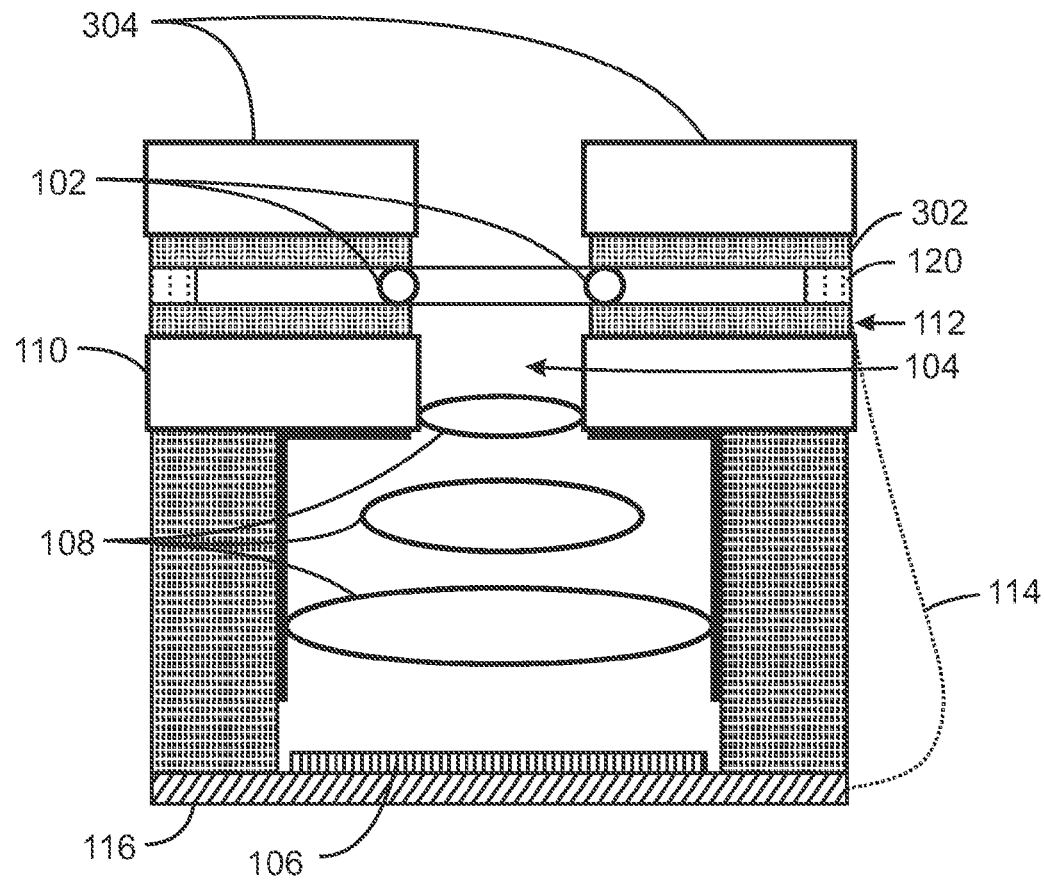
FIG. 3 is a block diagram of the apparatus including the ferrofluid shutter in an open position with a ferrofluid disposed between coils.

FIG. 3 is a block diagram of the apparatus including the ferrofluid shutter in an open position with a ferrofluid disposed between coils. In some cases, the magnet 110 and the coil 112 may be considered as a first magnet-coil pair. As indicated in FIG. 3, the techniques described herein may include a second magnet-coil pair including a second coil 302 and a second magnet 304. The second coil 302 may be configured to generate a magnetic field and the second magnet 304 may be configured to direct a propagation of the magnetic field. In this scenario, the second magnet-coil pair including the second coil 302 and the magnet 304 may increase a strength and direction of a combined magnetic field including the magnetic field generated by the first coil 112 and the first magnet 110 as well as the magnetic field generated by the second coil 302 and the second magnet 304. The increased strength may decrease delay in opening and closing the aperture 104. Although the description above discusses only one magnet in a magnet coil pair, such as either magnet 110 or magnet 304, multiple magnets may be used including magnets of various shapes and dispositions as discussed in more detail below in regard to FIG. 4 and FIG. 5.

Figure 4:
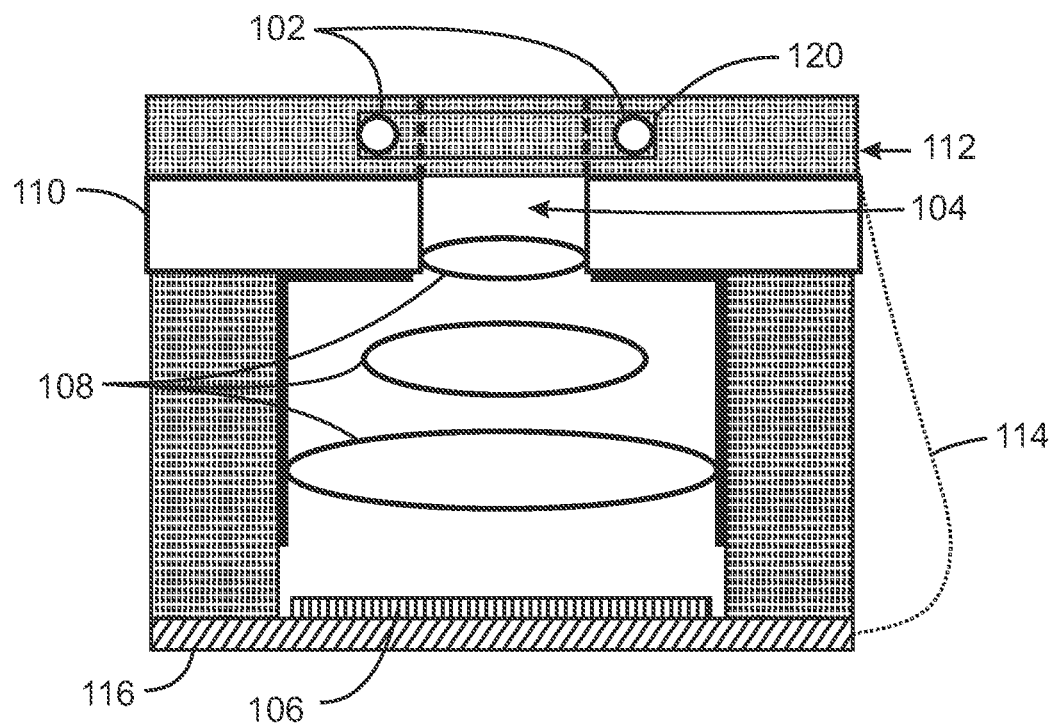
FIG. 4 is a block diagram of the apparatus including the ferrofluid shutter in an open position with a ferrofluid disposed in a circuit board.

FIG. 4 is a block diagram of the apparatus including the ferrofluid shutter in an open position with a ferrofluid disposed in a circuit board. In FIG. 4, the coil 112 may be formed in a circuit board, such as a flexible circuit board. As illustrated in the example diagram 400 of FIG. 4, the container 120 may be configured as a component of the coil 112 in a flexible circuit board as a discrete component, an integrated component, or any combination thereof.

Figure 5:
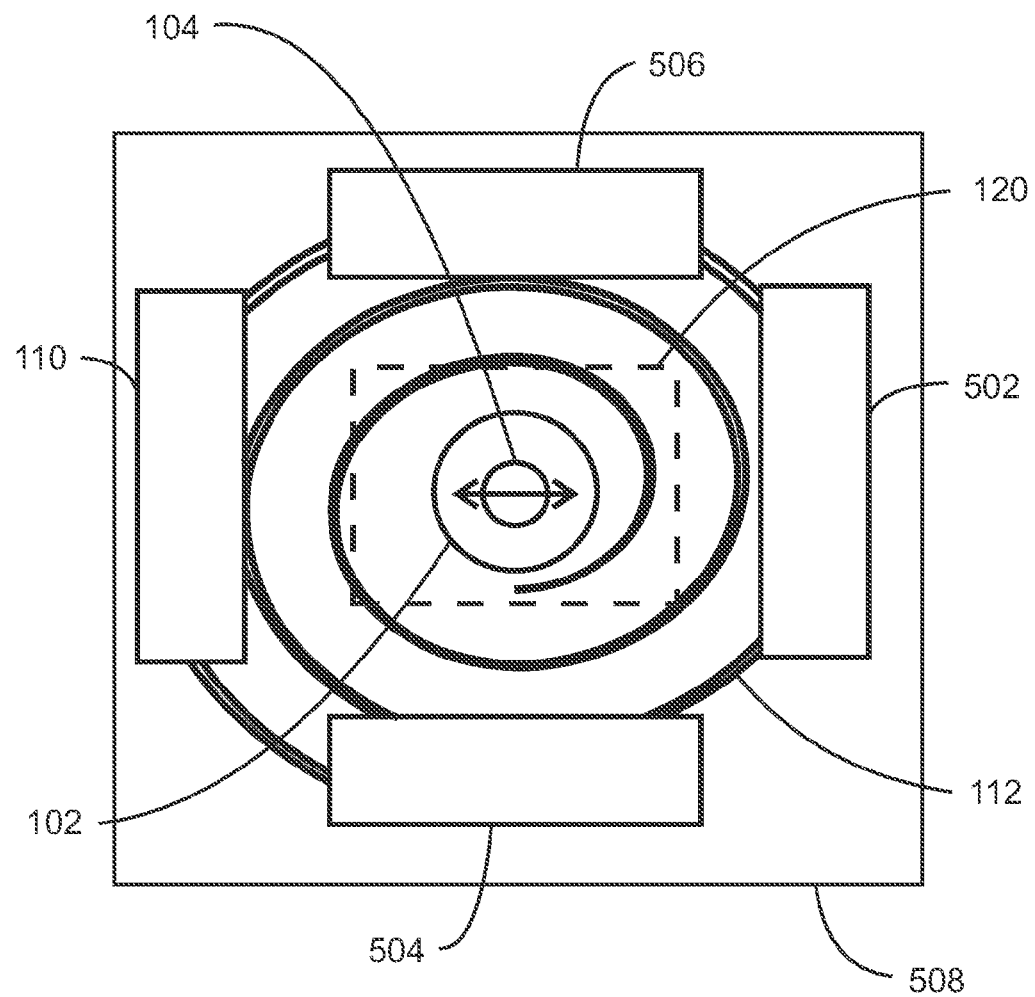
FIG. 5 is a diagram illustrating a top view of the ferrofluid shutter.

FIG. 5 is a diagram illustrating a top view of the ferrofluid shutter. As discussed above in regard to FIG. 1-FIG. 3, the coil 112 may be disposed around a perimeter of the aperture 104. In the top view 500 of FIG. 5, the ferrofluid 102 disposed in the container 120 exposes the aperture 104 as electrical current is applied to the coil 112. Further, as discussed above, the magnet 110 may be one of multiple magnets disposed around the aperture 104 including magnets 502, 504, and 506. Further, the coil 112 and the magnets 110 as well as magnets 502, 504, 506, may be considered an inductor and formed on a circuit board, indicated at 508.

The disposition of the magnets including magnet 110 as well as magnets 502, 504, and 506 may guide a propagation direction of the magnetic field generated when electrical force is applied at the coil 112. As indicated by the arrow in FIG. 4, the aperture 102 may be exposed as the ferrofluid 102 is attracted towards the magnets in the direction of magnetic field propagation.

Figure 6:
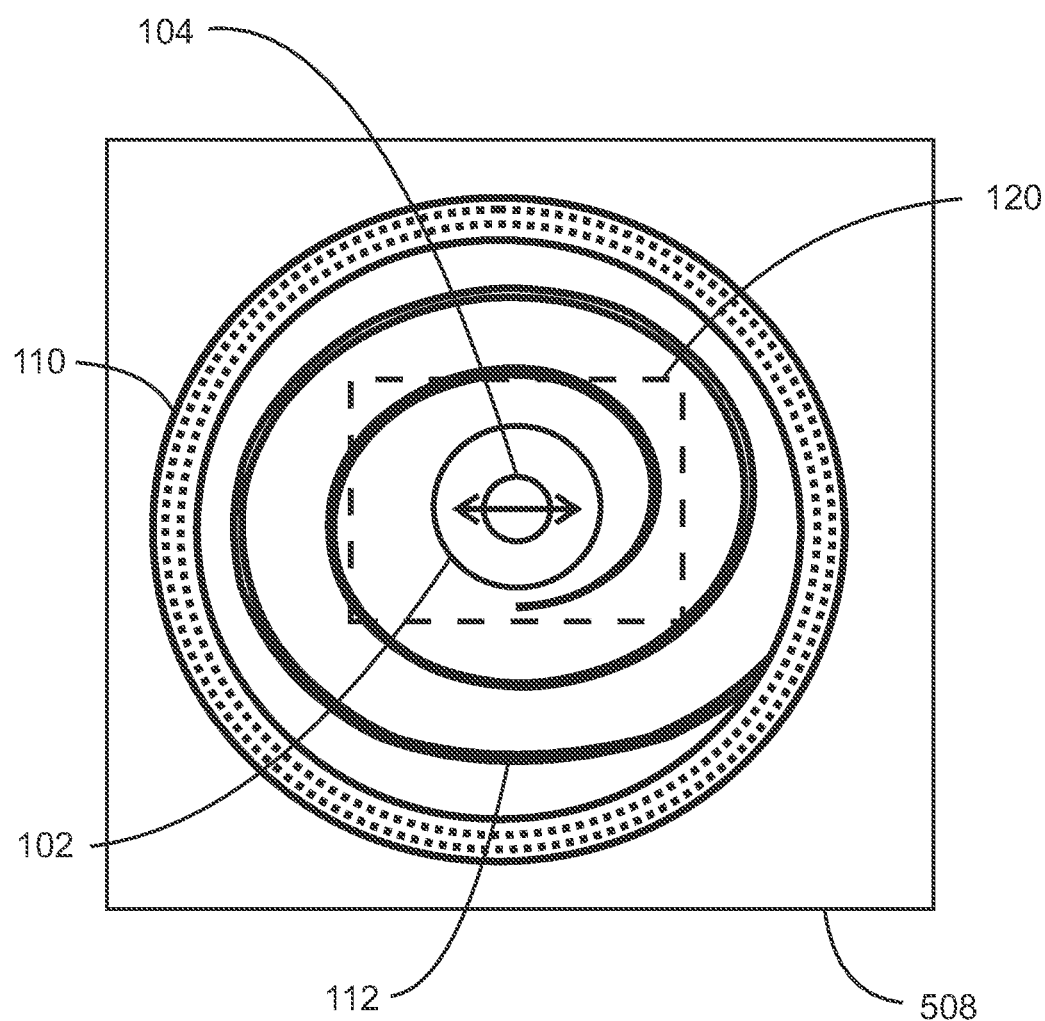
FIG. 6 is a diagram illustrating a top view of the ferrofluid shutter and a magnet having a curved portion.

FIG. 6 is a diagram illustrating a top view of the ferrofluid shutter and a magnet having a curved portion. As discussed above in regard to FIG. 3, magnets may include different shaped magnets. As illustrated in the top view 600 of FIG. 5, the magnet 110 may include a curved portion. In some cases, the magnet 110 may be only partially curved and additional magnets may be used. However, as illustrated in FIG. 6, the magnet 110 may be a circular magnet having a curvature similar to a curvature of the aperture 102. In this scenario, the ferrofluid 102 in the container 120 may be pulled towards the magnet 110 in a circular fashion such that the aperture 104 may be exposed in a substantially uniform manner when electrical current is applied to the coil 112, as well as obscured in a substantially uniform manner when electrical current is reversed.

Figure 7:
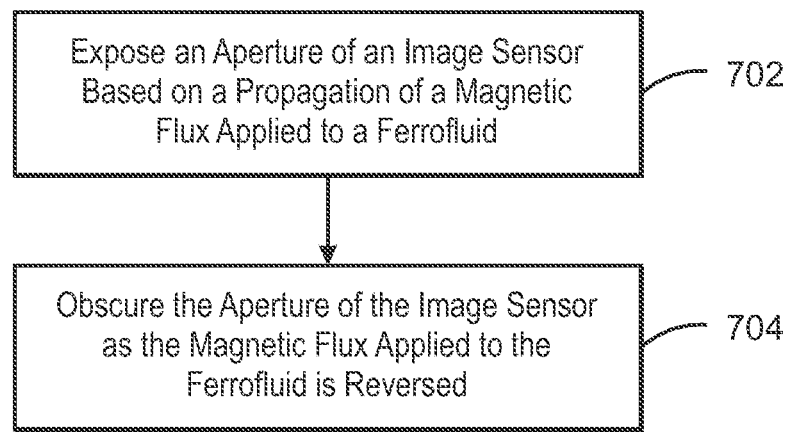
FIG. 7 is a block diagram illustrating a method for operating a magnetic fluid structure.

FIG. 7 is a block diagram illustrating a method for operating a magnetic fluid structure. At block 702, the method 700 includes exposing an aperture of an image sensor based on a propagation of a magnetic flux applied to a ferrofluid. At block 704, the method 700 includes obscuring the aperture of the image sensor as the magnetic flux applied to the ferrofluid is reversed.

In some cases, obscuring the aperture of the image sensor as the magnetic flux applied to the ferrofluid is reversed at block 704 generates an increase in uniform shading associated with image capture of the image sensor. Further, in some cases, the magnet is one of a plurality of magnets disposed around a perimeter of the aperture. In this scenario, the method 700 may include directing the propagation direction of the magnetic flux via the plurality of magnets disposed around the perimeter of the aperture.

In some cases, the method 700 may also include generating a magnetic field associated with the magnetic flux by applying a current to a coil around a perimeter of the aperture. In this scenario, the method 700 may also include directing the propagation of the magnetic flux via a magnet disposed at the perimeter of the aperture. In some case, the coil is a first coil, the magnet is a first magnet, and the magnetic field is a first magnetic field. In this scenario, the method 700 may also include generating a second magnetic field by applying a current to a second coil, and directing propagation direction of the second magnetic field via a second magnet. In this case, the ferrofluid is sandwiched between a first combination of the first coil and the first magnet and a second combination of the second coil and the second magnet. Further, in this case, the method 700 may include increasing the strength of a combined magnetic flux associated with the first combination and the second combination that is applied to the ferrofluid.

In some cases, exposing the aperture of the image sensor defines an opening. In this scenario, the method 700 may further include varying a size of the opening by varying a current associated with the magnetic flux.

EXAMPLE

Example 1 is an apparatus for magnetic fluid shutter operation. In this example, the wireless charging device may include an aperture of an image sensor, and a ferrofluid to expose the aperture based on propagation of a magnetic flux applied to the ferrofluid.

Example 2 includes the apparatus of example 1. This example includes a container to hold the ferrofluid.

Example 3 includes the apparatus of any combination of examples 1-2. This example includes a coil to generate a magnetic field having the magnetic flux.

Example 4 includes the apparatus of any combination of examples 1-3. This example includes a magnet to direct the propagation of the magnetic flux.

Example 5 includes the apparatus of any combination of examples 1-4. In this example, the coil is a first coil, the magnet is a first magnet, and the magnetic field is a first magnetic field. This example includes a second coil to generate a second magnetic field, and a second magnet to direct a propagation of the second magnetic field.

Example 6 includes the apparatus of any combination of examples 1-5. In this example, the container is disposed in between a first combination of the first coil and the first magnet and a second combination of the second coil and the second magnet.

Example 7 includes the apparatus of any combination of examples 1-6. In this example disposing the container between the first combination of the first coil and the first magnet and the second combination of the second coil and the second magnet is configured to increase a strength of the magnetic flux applied to the ferrofluid.

Example 8 includes the apparatus of any combination of examples 1-7. In this example, the magnet is one of a plurality of magnets configured to direct the propagation of the magnetic flux.

Example 9 includes the apparatus of any combination of examples 1-8. In this example, the magnet may include a curved portion matching a curve associated with the aperture.

Example 10 includes the apparatus of any combination of examples 1-9. In this example, the ferrofluid is configured to obscure the exposed the aperture based reversal of the magnetic flux.

Example 11 is a method for magnetic fluid shutter operation. In this example, the wireless charging device may include exposing an aperture of an image sensor based on a propagation of a magnetic flux applied to a ferrofluid, and obscuring the aperture of the image sensor as the magnetic flux applied to the ferrofluid is reversed.

Example 12 includes the method of example 11. This example includes generating a magnetic field associated with the magnetic flux by applying a current to a coil around a perimeter of the aperture.

Example 13 includes the method of any combination of examples 11-12. This example includes directing the propagation of the magnetic flux via a magnet disposed at the perimeter of the aperture.

Example 14 includes the method of any combination of examples 11-13. In this example, the coil is a first coil, the magnet is a first magnet, and the magnetic field is a first magnetic field. This example includes generating a second magnetic field by applying a current to a second coil, and directing propagation of the second magnetic field via a second magnet. In this example, the ferrofluid is sandwiched between a first combination of the first coil and the first magnet and a second combination of the second coil and the second magnet.

Example 15 includes the method of any combination of examples 11-14. This example includes increasing a strength of a combined magnetic flux associated with the first combination and the second combination that is applied to the ferrofluid.

Example 16 includes the method of any combination of examples 11-15. In this example exposing the aperture of the image sensor defines an opening.

Example 17 includes the method of any combination of examples 11-16. This example includes varying a size of the opening by varying a current associated with the magnetic flux.

Example 18 includes the method of any combination of examples 11-17. This example includes reversing the magnetic flux applied to the ferrofluid.

Example 19 includes the method of any combination of examples 11-18. In this example obscuring the aperture of the image sensor as the magnetic flux applied to the ferrofluid is reversed generates an increase in uniform shading associated with image capture of the image sensor.

Example 20 includes the method of any combination of examples 11-19. In this example, the magnet is one of a plurality of magnets disposed around a perimeter of the aperture, the method further including directing the propagation of the magnetic flux via the plurality of magnets disposed around the perimeter of the aperture.

Example 21 is a system for magnetic fluid shutter operation. In this example, the wireless charging device may include an aperture of an image sensor, a coil to generate a magnetic field having a magnetic flux, a ferrofluid shutter to expose the aperture based on a propagation of the magnetic flux applied to the ferrofluid shutter.

Example 22 includes the system of example 21. This example includes a container to hold the ferrofluid.

Example 23 includes the system of any combination of examples 21-22. This example includes a flexible circuit board. In this example, the ferrofluid is disposed within a container of the flexible circuit board.

Example 24 includes the system of any combination of examples 21-23. This example includes a magnet to direct the propagation of the magnetic flux.

Example 25 includes the system of any combination of examples 21-24. In this example, the coil is a first coil, the magnet is a first magnet, and the magnetic field is a first magnetic field. This example includes a second coil to generate a second magnetic field, and a second magnet to direct a propagation of the second magnetic field.

Example 26 includes the system of any combination of examples 21-25. In this example, the container is disposed in between a first combination of the first coil and the first magnet and a second combination of the second coil and the second magnet.

Example 27 includes the system of any combination of examples 21-26. In this example disposing the container between the first combination of the first coil and the first magnet and the second combination of the second coil and the second magnet is configured to increase a strength of the magnetic flux applied to the ferrofluid.

Example 28 includes the system of any combination of examples 21-27. In this example, the magnet is one of a plurality of magnets configured to direct the propagation of the magnetic flux.

Example 29 includes the system of any combination of examples 21-28. In this example, the magnet may include a curved portion matching a curve associated with the aperture.

Example 30 includes the system of any combination of examples 21-29. In this example, the ferrofluid is configured to obscure the exposed the aperture based reversal of the magnetic flux.

Example 31 is an apparatus for magnetic fluid shutter operation. In this example, the wireless charging device may include an aperture of an image sensor, and a means to expose the aperture based on propagation of an applied magnetic flux.

Example 32 includes the apparatus of example 31. This example includes a container to hold the means to expose the aperture.

Example 33 includes the apparatus of any combination of examples 31-32. This example includes a coil to generate a magnetic field having the magnetic flux.

Example 34 includes the apparatus of any combination of examples 31-33. This example includes a magnet to direct the propagation of the magnetic flux.

Example 35 includes the apparatus of any combination of examples 31-34. In this example, the coil is a first coil, the magnet is a first magnet, and the magnetic field is a first magnetic field. This example includes a second coil to generate a second magnetic field, and a second magnet to direct a propagation of the second magnetic field.

Example 36 includes the apparatus of any combination of examples 31-35. In this example, the container is disposed in between a first combination of the first coil and the first magnet and a second combination of the second coil and the second magnet.

Example 37 includes the apparatus of any combination of examples 31-36. In this example disposing the container between the first combination of the first coil and the first magnet and the second combination of the second coil and the second magnet is configured to increase a strength of the magnetic flux applied to the means to expose the aperture.

Example 38 includes the apparatus of any combination of examples 31-37. In this example, the magnet is one of a plurality of magnets configured to direct the propagation of the magnetic flux.

Example 39 includes the apparatus of any combination of examples 31-38. In this example, the magnet may include a curved portion matching a curve associated with the aperture.

Example 40 includes the apparatus of any combination of examples 31-39. In this example, the means to expose the aperture is configured to obscure the exposed the aperture based reversal of the magnetic flux.

Example 41 is a system for magnetic fluid shutter operation. In this example, the wireless charging device may include an aperture of an image sensor, a coil to generate a magnetic field having a magnetic flux, a means to expose the aperture based on a propagation of the magnetic flux applied to the means.

Example 42 includes the system of example 41. This example includes a container to hold the means to expose the aperture.

Example 43 includes the system of any combination of examples 41-42. This example includes a flexible circuit board. In this example, the means to expose the aperture is disposed within a container of the flexible circuit board.

Example 44 includes the system of any combination of examples 41-43. This example includes a magnet to direct the propagation of the magnetic flux.

Example 45 includes the system of any combination of examples 41-44. In this example, the coil is a first coil, the magnet is a first magnet, and the magnetic field is a first magnetic field. This example includes a second coil to generate a second magnetic field, and a second magnet to direct a propagation of the second magnetic field.

Example 46 includes the system of any combination of examples 41-45. In this example, the container is disposed in between a first combination of the first coil and the first magnet and a second combination of the second coil and the second magnet.

Example 47 includes the system of any combination of examples 41-46. In this example disposing the container between the first combination of the first coil and the first magnet and the second combination of the second coil and the second magnet is configured to increase a strength of the magnetic flux applied to the means to expose the aperture.

Example 48 includes the system of any combination of examples 41-47. In this example, the magnet is one of a plurality of magnets configured to direct the propagation of the magnetic flux.

Example 49 includes the system of any combination of examples 41-48. In this example, the magnet may include a curved portion matching a curve associated with the aperture.

Example 50 includes the system of any combination of examples 41-49. In this example, the means to expose the aperture is configured to obscure the exposed the aperture based reversal of the magnetic flux.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for magnetic fluid shutter operation, comprising:

an aperture of an image sensor;
a ferrofluid to open and close the aperture based on propagation of a magnetic flux applied to the ferrofluid; and
an inductor formed on a circuit board, the inductor to: open the aperture when a current is applied; and close the aperture when the current is reversed.

2. The apparatus of claim 1, further comprising a container to hold the ferrofluid.

3. The apparatus of claim 1, wherein the inductor comprises a coil to generate a magnetic field having the magnetic flux.

4. The apparatus of claim 1, wherein the ferrofluid is configured to obscure the exposed aperture based on a reversal of the magnetic flux.

5. The apparatus of claim 1, wherein the circuit board comprises a flexible circuit board.

6. The apparatus of claim 3, wherein the inductor comprises a magnet to direct the propagation of the magnetic flux.

7. The apparatus of claim 3, wherein the magnet is one of a plurality of magnets configured to direct the propagation of the magnetic flux.

8. The apparatus of claim 3, wherein the magnet comprises a curved portion matching a curve associated with the aperture.

9. The apparatus of claim 6, wherein the coil is a first coil, the magnet is a first magnet, and the magnetic field is a first magnetic field, further comprising:
a second coil to generate a second magnetic field; and
a second magnet to direct a propagation of the second magnetic field.

10. The apparatus of claim 9, wherein a container is disposed in between a first combination of the first coil and the first magnet and a second combination of the second coil and the second magnet.

11. The apparatus of claim 10, wherein disposing the container between the first combination of the first coil and the first magnet and the second combination of the second coil and the second magnet is configured to increase a strength of the magnetic flux applied to the ferrofluid.

12. A method for magnetic fluid shutter operation, comprising:
exposing an aperture of an image sensor by applying a current to an inductor formed on a circuit board, wherein the inductor is disposed around a perimeter of the aperture, and the inductor propagates a magnetic flux applied to a ferrofluid; and
obscuring the aperture of the image sensor by reversing the current to the inductor, wherein the magnetic flux applied to the ferrofluid is reversed.

13. The method of claim 12, further comprising generating a magnetic field associated with the magnetic flux by applying the current to a coil of the inductor.

14. The method of claim 12, wherein exposing the aperture of the image sensor defines an opening.

15. The method of claim 12, wherein obscuring the aperture of the image sensor as the magnetic flux applied to the ferrofluid is reversed generates an increase in uniform shading associated with image capture of the image sensor.

16. The method of claim 12, wherein the magnet is one of a plurality of magnets of the inductor, the method further comprising directing propagation of the magnetic flux via the plurality of magnets.

17. The method of claim 13, further comprising directing propagation of the magnetic flux via a magnet of the inductor.

18. The method of claim 14, further comprising varying a size of the opening by varying a current associated with the magnetic flux.

19. The method of claim 17, wherein the coil is a first coil, the magnet is a first magnet, and the magnetic field is a first magnetic field, further comprising:
generating a second magnetic field by applying a current to the second coil of the inductor; and
directing propagation of the second magnetic field via a second magnet of the inductor, wherein the ferrofluid is sandwiched between a first combination of the first coil and the first magnet and a second combination of the second coil and the second magnet.

20. The method of claim 19, further comprising increasing a strength of a combined magnetic flux associated with the first combination and the second combination that is applied to the ferrofluid.

21. A system for magnetic fluid shutter operation, comprising:
an aperture of an image sensor;
a ferrofluid shutter to expose open and close the aperture based on a propagation of a magnetic flux applied to the ferrofluid shutter; and
an inductor formed on a circuit board, the inductor to: open the aperture when a current is applied; and close the aperture when the current is reversed.

22. The system of claim 21, further comprising:
a container to hold the ferrofluid shutter;
a coil to generate a magnetic field having the magnetic flux; and
a magnet to direct the propagation of the magnetic flux, wherein the inductor comprises the magnet and the coil.

23. The system of claim 22, wherein the coil is a first coil, the magnet is a first magnet, and the magnetic field is a first magnetic field, further comprising:
a second coil to generate a second magnetic field; and
a second magnet to direct a propagation of the second magnetic field, wherein the inductor comprises the magnet and the coil.

24. The system of claim 23, wherein the container is disposed in between a first combination of the first coil and the first magnet and a second combination of the second coil and the second magnet.

* * * * *